March 22, 1927.

C. VAN RENNES

ELECTRICAL APPARATUS

Filed Sept. 4, 1923

Inventor
CORNELIS VAN RENNES.
By J. Ralph Fiehr
His Attorney

March 22, 1927.

C. VAN RENNES 1,621,914

ELECTRICAL APPARATUS

Filed Sept. 4, 1923

Inventor
CORNELIS VAN RENNES,
By J. Ralph Fiehr
His Attorney

Patented Mar. 22, 1927.

1,621,914

UNITED STATES PATENT OFFICE.

CORNELIS VAN RENNES, OF DAYTON, OHIO, ASSIGNOR TO DELCO-LIGHT COMPANY, OF DAYTON, OHIO, A CORPORATION OF DELAWARE.

ELECTRICAL APPARATUS.

Application filed September 4, 1923. Serial No. 660,664.

This invention relates to electric motors, and includes among its objects to cause the motor to operate periodically in either direction of rotation by mechanism which can be housed within the motor frame, and which is durable and reliable.

In forms of the invention shown herein there are provided a plurality of sets of brushes, the brushes of each set being disposed substantially diametrically opposite but off set from the neutral point on the commutator. Mechanism is provided for causing the sets of brushes to alternately engage and disengage the commutator, effecting a reversal of rotation thereof.

Other and further objects of the present invention will be apparent from the following description, reference being had to the accompanying drawings wherein a preferred embodiment of one form of the present invention is clearly shown.

Figure 1:
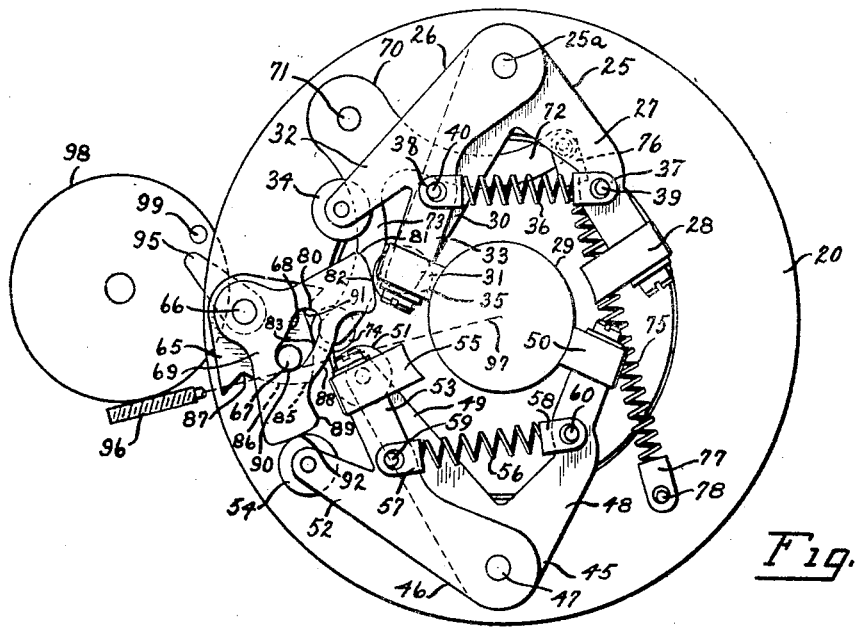
Fig. 1 is a diagrammatic end view of a motor embodying a form of the present invention.

Referring to the drawings, and more particularly to Fig. 1, a supporting plate 20 adapted to be attached to the frame of a motor carries arms 25 and 26 pivoted at 25ª. Arm 25 is provided with branch 27 which carries brush 28 for engaging a motor commutator 29, and a branch 30 carrying roller 31. Arm 26 is provided with branches 32 and 33 which carry roller 34 and brush 35 respectively. Arms 25 and 26 are connected by spring 36 to the ends of which are attached clips 37 and 38 engaging pins 39 and 40 carried by arms 25 and 26 respectively.

Arms 45 and 46 are pivoted upon plate 20 at 47. Arm 45 includes branches 48 and 49 which carry brush 50 and roller 51 respectively. Arm 46 includes branches 52 and 53 which carry roller 54 and brush 55 respectively. Arms 45 and 46 are connected by spring 56 to the ends of which are attached clips 57 and 58 engaging pins 59 and 60 carried by arms 46 and 45 respectively.

An acorn shaped cam 65 is pivoted on pin 66 carried by supporting plate 20, and has secured thereto a lever 95. A worm 96 secured to a motor armature shaft 97 cooperates with a worm gear 98, which is mounted in any suitable manner. A lug 99 carried by the worm gear 98 is adapted to engage the lever 95, thereby moving the cam 65 in opposite directions upon reversal of the motor. Cam 65 carries a stud 67 which cooperates with an arcuate slot 68 in cam 69 which is attached to shaft 66. A retaining pawl 70, pivoted at 71, is provided with curved branches 72 and 73, the branch 73 carrying a roller 74 adjacent its extremity. A spring 75, to the ends of which are attached clips 76 and 77, connects branch 72 with a stud 78 carried by plate 20. This spring 75 tends yieldingly to maintain roller 74 in contact with the camming surfaces of the cam 65.

Brushes 28 and 55, and brushes 35 and 50 are mounted diametrically opposite with respect to each other, and are off set from the neutral point on the commutator 29.

Assuming that the brushes are in the position shown in Fig. 1, then upon clockwise rotation of worm gear 98, lug 99 will engage lever 95 causing counter-clockwise direction of rotation of cam 65. The stud 67 will then operate in slot 68 and upon striking surface 80, the cam 69 will be moved in a counter-clockwise direction. As cam 69 moves in this direction, surface 81 of cam 69 will engage roller 34 thereby camming arm 26 in a clockwise direction about its pivot 25ª, thereby lifting brush 35 off the commutator 29. As brush 35 is being lifted off the commutator, the brush 28 will be drawn toward the commutator by action of the spring 36 which moves arm 25 on its pivot 25ª. The spring 36 will also hold roller 31 in contact with surface 82. At this time roller 74 is traveling over camming surface 83 of cam 65. When roller 74 comes in contact with the point 85 of cam 65, the spring 75 will cause roller 74 to quickly travel over surface 86 into notch 87. Roller 31 will also be drawn into engagement with the curved surface 88. In this manner the brush 35 is quickly lifted off the commutator and brush 28 is quickly brought into contact with the commutator. At the same time, surface 89 engages roller 51, thus moving arm 45 in a clockwise direction on its pivot 47, lifting brush 50 out of contact with the commutator 29, at which time the spring 56 will bring brush 55 into contact with the commutator. This shifting of brushes 35 and 50 out of engagement with the commutator and brushes 28 and 55 into engagement with the commutator will cause a reversal of the polarity of the motor armature and thereby cause the same to rotate in an opposite direction.

Figures 3, 4:
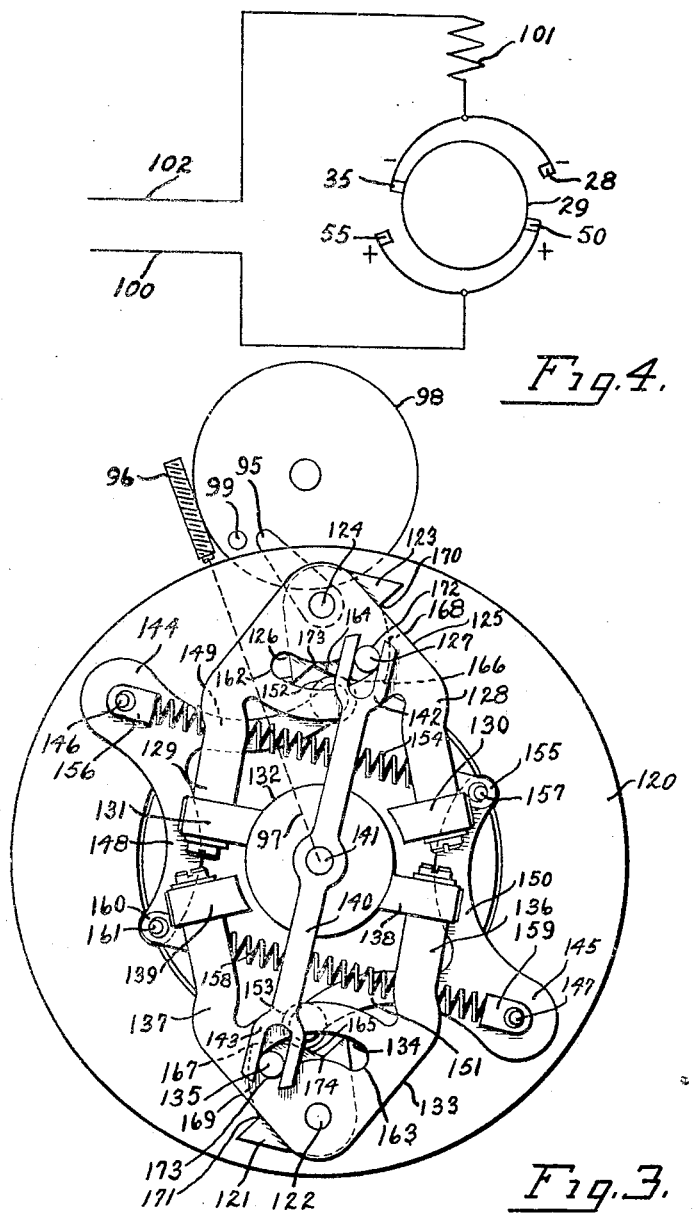
Fig. 4 is a wiring diagram of the circuit connections employed in the disclosed forms of the invention.

Referring to Fig. 4, the circuit connections are shown to correspond with the position of the brushes as shown in Fig. 1. The circuit thus shown is as follows: from a suitable source of current, wire 100, brush 50, commutator 29, brush 35, series field 101, wire 102, back to the source of current. However, when the brushes 35 and 50 are lifted from the commutator and the brushes 28 and 55 brought into engagement therewith, in the manner above described, the polarity of the motor armature will be reversed, causing rotation thereof in the opposite direction. The circuit will then be as follows: from the source of current, wire 100, brush 55, commutator 29, brush 28, series field 101, wire 102 back to the source of current.

As soon as the direction of rotation of the motor is reversed, the lug 99 will engage lever 95 and cam 65 will also be rotated in an opposite or clockwise direction, causing stud 67 to engage surface 90 thereby rotating cam 69 in a clockwise direction. Spring 36 will cause the roller 34 to follow surface 81 and surface 82 will engage roller 31, thus rotating arm 25 is a counter-clockwise direction on its pivot 25ª, and lifting brush 28 out of engagement with the commutator. As brush 28 is lifted, the spring 36 acts to bring brush 35 into engagement with the commutator. Roller 74 will also travel over surface 86 of cam 65, and upon reaching the point 85 thereof, spring 75 will cause the roller to ride quickly over the surface 83 into the notch 91. Surface 92 of cam 69 will engage roller 54, moving arm 46 in a counter-clockwise direction on its pivot 47, thus lifting brush 55 out of engagement with the commutator, the spring 56 thereupon bringing brush 50 into contact with the commutator. A reversal of rotation of the armature is thereby secured in the same manner as above, and this cycle of operation will continue as long as the motor circuit remains closed and the cam 65 is oscillated.

Figure 2:
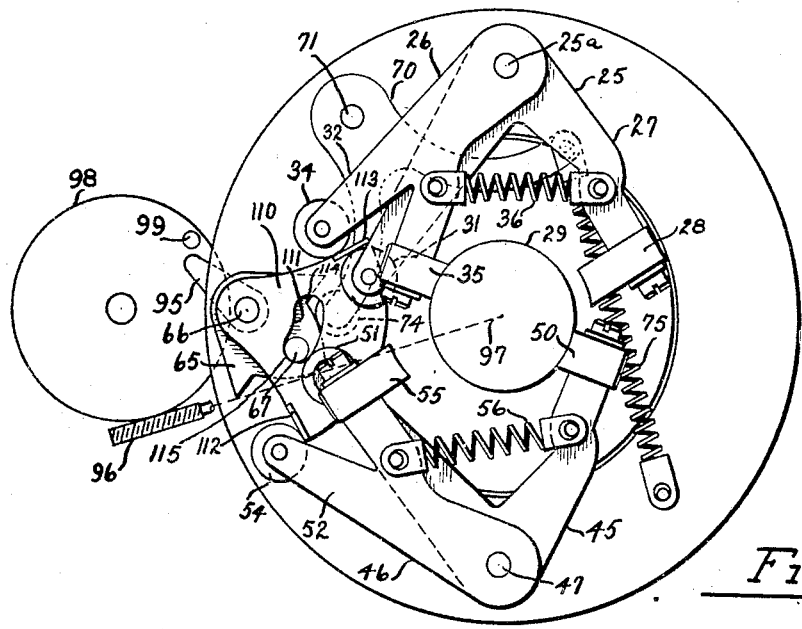
Figs. 2 and 3 are similar views of modified forms of the present invention.

The mechanism shown in Fig. 2 is substantially the same as that shown in Fig. 1 with the exception of the cam 110 which replaces the cam 69 shown in Fig. 1. This cam 110 is provided with an arcuate slot 111 which cooperates with stud 67 carried by cam 65, and also with flanges 112 and 113. When cam 65 is rotated in a counter-clockwise direction, as viewed in Fig. 2, the stud 67 will engage with the surface 114 and thereby rotate cam 110 in a counter-clockwise direction. As cam 110 rotates in this direction, roller 54 will follow flange 112 being held thereagainst by spring 56, and brush 55 will come into contact with commutator 29. At the same time the flange 112 will contact with roller 51, swinging arm 45 in a clockwise direction on its pivot 47 and lifting brush 50 out of contact with commutator 29. The flange 113 will engage roller 34 and lift brush 35 through movement of arm 26 in a clockwise direction on its pivot 25ª. This movement of arm 26 will through means of spring 36 cause a clockwise direction of movement of arm 25, thereby lowering brush 28 into contact with the commutator 29. Retaining pawl 70 and roller 74 will cooperate with cam 65 in the same manner as described in connection with Fig. 1. The simultaneous raising of brushes 35 and 50 and the lowering of brushes 55 and 28 will reverse the polarity of the armature and cause it to rotate in the opposite direction. Upon this reversal of direction of rotation, the cam 65 will be moved in a clockwise direction, the stud 67 striking the surface 115 and moving cam 110 in a clockwise direction. The flange 113 will then engage roller 31 and swing arm 25 in a counter-clockwise direction thereby lifting brush 28 away from commutator 29. At the same time brush 35 is quickly brought into engagement with commutator 29 by action of the retaining pawl 70 and roller 74 as above described. Flange 112 will contact with roller 54 thereby lifting brush 55. Brush 50 will be quickly brought into engagement with the commutator 30 by action of retaining pawl 70 and roller 74 cooperating with cam 65, as above described.

Referring to Fig. 3, supporting plate 120 carries an acorn shaped cam 121 pivoted at 122. Acorn shaped cam 123 is secured to shaft 124 which passes through plate 120 and is provided with lever 95 adapted to be engaged by lug 99 carried by worm gear 98 in the manner above described. Brush arm 125 is also secured to shaft 124 and is provided with an arcuate slot 126 which cooperates with a stud 127 carried by cam 123. Brush arm 125 is provided with branches 128 and 129 which carry brushes 130 and 131, respectively, adapted for engagement with commutator 132. Brush arm 133 is pivoted at 122 and is provided with an arcuate slot 134 which cooperates with a stud 135 carried by cam 121. Brush arm 133 is provided with branches 136 and 137 which carry brushes 138 and 139 respectively, adapted for engagement with commutator 132. Brushes 131 and 138 are disposed at substantially 180 degrees with respect to each other, the same being true with regard to brushes 130 and 139. Each of these sets of brushes, however, are off-set from the neutral point on the commutator 132. A lever 140, pivoted at 141, is provided with forked ends 142 and 143 which cooperate with studs 127 and 135 respectively. It will be apparent that when cam 123 and stud 127 move in a given direction, this movement will be transmitted to stud 135 by lever 140, whereby to move stud 135 and consequently cam 121 in an opposite direction.

Retaining pawl members 144 and 145 are pivoted at 146 and 147 respectively, and are provided with curved branches 148 and 149 and 150 and 151 respectively. Branches 149 and 151 carry at their free ends rollers 152 and 153 respectively. A spring 154 is provided with clips 155 and 156 at its opposite ends, the clip 155 being secured to the stud 157, carried by branch 150 adjacent its free end, and clip 156 engaging pivot pin 146. Thus the spring 154 tends to hold roller 153 in yielding contact with the camming surfaces of the cam 121. A spring 158 is provided with clips 159 and 160 at its opposite ends, the clip 159 being secured to the pivot 147, and clip 160 engaging stud 161 carried by branch 148 adjacent its free end. Thus the spring 158 tends to hold roller 152 in yielding contact with the camming surfaces of the cam 123.

Assume the mechanism is in the position shown in Fig. 3. When the cam 123 is moved in a clockwise direction by engagement of lug 99 with lever 95, the lever 140 will be rotated in a counter-clockwise direction on its pivot 141, thereby moving cam 121 through forked portion 143 and stud 135, in a clockwise direction on its pivot 122. Simultaneously with the striking of the pin 127 against the surface 162, the stud 135 will strike surface 163. At this time, the arms 125 and 133 will be moved in a clockwise direction, the rollers 152 and 153 riding on the surfaces 164 and 165 respectively of cams 123 and 121 respectively. As these cams 123 and 121 continue to rotate, the rollers 152 and 153 will come in contact with the points 166 and 167 of cams 123 and 121 respectively. The rollers 152 and 153 will then quickly move over the surfaces 168 and 169 respectively by action of springs 158 and 154 respectively into the notches 170 and 171 respectively, thereby quickly raising brushes 131 and 138 out of contact with commutator 132 and quickly lowering brushes 130 and 139 into contact therewith. This shifting of the brushes just described will reverse the polarity of the motor armature and thereby cause it to rotate in a reverse direction. Thereupon the cams 123 and 121 will be rotated in a counter-clockwise direction, causing studs 127 and 135 to engage surfaces 172 and 173 respectively and thereby move arms 125 and 133 in a counter-clockwise direction on their pivots 124 and 122 respectively. Rollers 152 and 153 which at this time are in engagement with surfaces 168 and 169 respectively, will move up into contact with the cam points 166 and 167 respectively, and will then quickly travel over surfaces 164 and 165 respectively into the notches 173 and 174 respectively by action of springs 158 and 154 respectively. This movement of arms 125 and 133 will cause brushes 130 and 139 to be quickly lifted out of contact with the commutator 132 and the brushes 131 and 138 to be quickly brought into engagement therewith, thereby reversing the polarity of the motor armature and causing it to rotate in the opposite direction. This cycle of operation will continue as long as the motor circuit remains closed and the cam 121 is oscillated.

It will be apparent from the foregoing description that it is impossible for the motor to stop with all of the motor brushes in engagement or out of engagement with the commutator. For example, in Figs. 1 and 2, should the motor stop before the roller 74 engages the point 85 of cam 65 and before dead center is passed, the roller 74 will be forced back by spring 75 into either the notch 87 or 91 of cam 65, dependent upon which camming surface of cam 65 the roller 74 happens to be in engagement with when the motor stops. When roller 74 is resting in notch 87, the brushes 35 and 50 will be in engagement with commutator 29, and brushes 28 and 55 will be out of engagement therewith. The position of these brushes with respect to the commutator will be reversed when roller 74 is resting in notch 91.

In the event the motor stops with roller 74 in engagement with the point 85 beyond dead center, the shifting of the brushes will be completed by action of spring 75.

While the forms of mechanism herein shown and described constitute preferred embodiments of one form of invention, it is to be understood that other forms might be adopted and various changes and alterations made in the shape, size, and proportion of the elements therein without departing from the spirit and scope of the invention.

What is claimed is as follows:

1. An automatically reversible motor, comprising in combination, a field member; an armature; a plurality of independent sets of commutator brushes off-set from the neutral point on the commutator, the brushes of each set being disposed substantially diametrically opposite; motor controlled means for causing a brush of one set and the next adjacent brush of another set alternately to engage the commutator periodically and at recurrent sequence; and separate means controlled by the movement of said first named brushes and the operation of the motor controlled means for causing the other brushes of said sets alternately to engage the commutator subsequently to the disengagement of the first named brushes with the commutator whereby the polarity of the armature is reversed.

2. An automatically reversible motor, comprising in combination, a field member; an armature; pivotally mounted brush arms, each being independently movable; motor brushes carried by said brush arms; means for moving either brush arm away fom the commutator; and means including a spring connecting the brush arms whereby movement of either brush arm away from the commutator will, after said brush has left the commutator cause the other brush to be yieldingly urged against the commutator.

3. An automatically reversible motor, comprising in combination, a field member; an armature; movable brushes for engaging the commutator; means for moving either brush from the commutator; a spring connecting the brushes whereby movement of either brush away from the commutator will cause the other brush to be yieldingly urged toward the commutator; means for moving said brushes away from the commutator; and means for staying the movement of the brush toward the commutator until said first means is rendered operable.

4. An automatically reversible motor, comprising in combination, a field member; an armature; pairs of independently movable brushes; means for moving either pair of brushes from the commutator; and springs connecting a bush of one pair with a brush of another pair whereby movement of either pair of brushes away from the commutator will cause the other pair of brushes to be yieldingly urged toward the commutator.

5. An automatically reversible motor, comprising in combination, a field member; an armature; a plurality of independently movable brushes adapted to engage the commutator; means interconnecting the brushes for normally tending to yieldingly maintain the brushes in engagement with the commutator; and motor controlled means for lifting one of said brushes from the commutator, said means being adapted to stay the movement of another brush toward the commutator until said means has operated to lift the first mentioned brush.

6. An automatically reversible motor, comprising in combination, a field member; an armature; a plurality of independent sets of commutator brushes off-set from the neutral point on the commutator, the brush of each set being disposed substantially diametrically opposite; motor controlled means for periodically and recurrently moving a brush of one set out of engagement with the commutator and subsequently moving another set of brushes into engagement with the commutator; and resilient means interposed between the brushes of the same set and controlled by the said motor controlled means for moving one brush of the set into engagement with the commutator after the other brush of said set has been moved out of engagement with said commutator.

In testimony whereof I hereto affix my signature.

CORNELIS VAN RENNES.